UNITED STATES PATENT OFFICE.

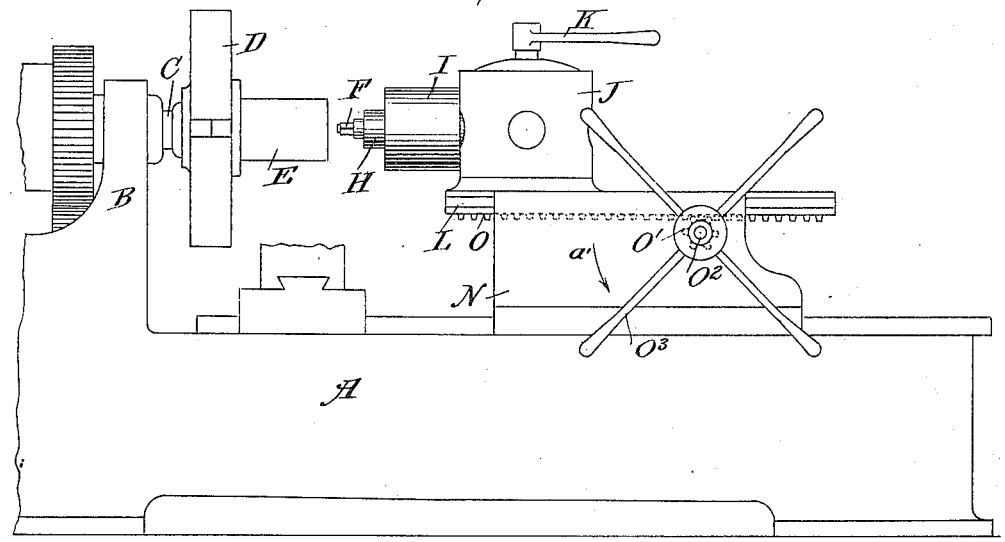
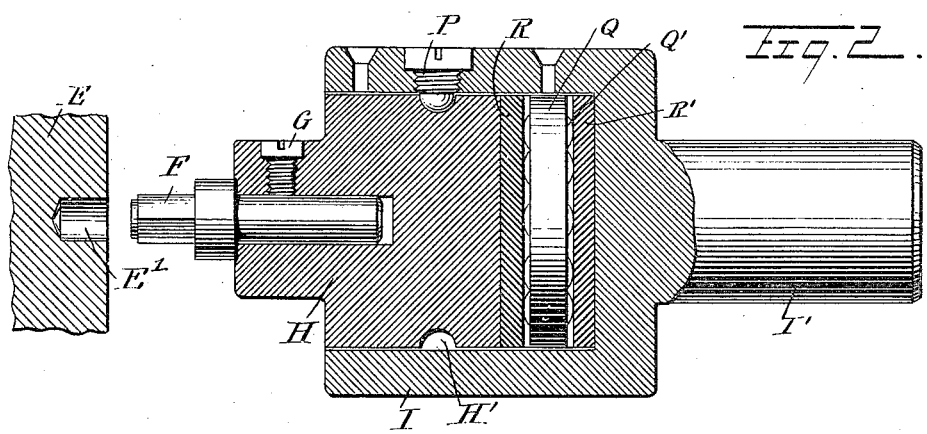
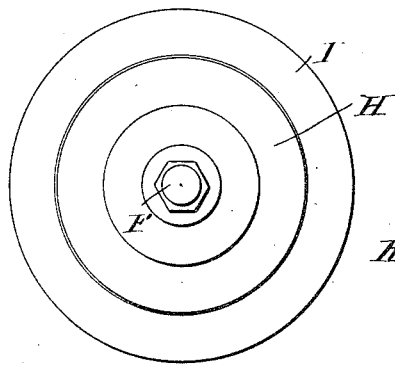

ROBERT F. SMITH, OF LYNN, MASSACHUSETTS.

SHAPING-MACHINE.

1,163,477.    Specification of Letters Patent.    Patented Dec. 7, 1915.

Application filed November 3, 1913. Serial No. 798,907.

*To all whom it may concern:*

Be it known that I, ROBERT F. SMITH, a citizen of the United States, and a resident of Lynn, in the county of Essex and State of Massachusetts, have invented new and useful Improvements in Shaping-Machines, of which the following is a full, clear, and exact description.

The invention relates to screw machines, turret lathes and like machines, and its object is to provide certain new and useful improvements in the art of shaping bodies whereby regularly or irregularly shaped holes or depressions are broached or produced, or the exterior surfaces of the bodies are changed to a predetermined shape in a very simple and effective manner and without requiring automatic brakes or stops on the machine.

In order to produce the desired result the body to be shaped is revolved and then the revolving body is subjected to the action of a shaping or a broaching tool, and the latter is rotated by and in unison with the revolving body. In order to carry this method into effect use is made of a revoluble work holder, a tool holder in axial alinement with the work holder and mounted to turn in a retainer having movement toward and from the work holder to advance the tool with a view to engage the tool with the work and to cause the tool and its holder to be rotated by and in unison with the work and its holder.

A practical embodiment of the invention is represented in the accompanying drawings forming a part of this specification, in which similar characters of reference indicate corresponding parts in all the views.

Figure 1 is a side elevation of a turret lathe provided with the improvements for shaping bodies; Fig. 2 is an enlarged longitudinal section of the work, the tool and the tool holder and its retainer; and Fig. 3 is a face view of the tool, tool holder and retainer.

The turret lathe shown in Fig. 1 is mounted on a suitable bed plate A provided with a head stock B, spindle C and chuck D carrying the work E to be shaped, the work having a central hole or recess E' of cylindrical form and to be given a different shape by a correspondingly-shaped tool F. As shown in Fig. 3 the tool F is hexagonal, for giving a hexagonal shape to the cylindrical hole E' in the work E.

The tool F is removably secured by a set screw G in a tool holder H having its axis coinciding with the tool F, the work E, chuck D and spindle C. The tool holder H is mounted to rotate loosely in a retainer I having a shank I' removably secured in a turret J provided with the operating lever K by any suitable means. The turret J is mounted on a turret slide L mounted to slide lengthwise in a bearing N held in the usual manner on the bed plate A. The under side of the turret slide L is provided with a rack O in mesh with a pinion O' secured on a transverse shaft $O^2$ journaled in the bearing N, and on the said shaft $O^2$ is secured a hand wheel $O^3$ under the control of the operator for turning the shaft $O^2$ and the pinion O' with a view to advance or retract the turret slide L and the parts carried thereby according to the direction in which the hand wheel $O^3$ is turned at the time.

The tool holder H is provided on its peripheral face with an annular groove H' into which projects a screw P held in the retainer I to prevent lengthwise movement of the tool holder H in the retainer I. In order to allow free rotation of the tool holder H in the retainer I during the time the body is shaped use is made of a ball bearing Q held within the retainer I and arranged between thrust plates R and R', of which the thrust plate R abuts against the inner end of the tool holder H while the thrust plate R' is seated on the retainer I, as plainly indicated in Fig. 2. The balls Q' of the ball bearing Q are in contact with the opposite faces of the thrust plates R and R' to permit the tool holder H to rotate freely within the retainer I at the time pressure is applied, as hereinafter more fully explained.

The operation is as follows: When the work E is attached to the chuck D and the tool F is fastened in place in the tool holder H and the spindle C is revolved then the operator turns the hand wheel $O^3$ in the direction of the arrow $a'$ so as to advance the turret J and with it the retainer I, tool holder H and the tool F to cause the tool F to pass into the hole or recess E' of the work E. As soon as the tool F makes firm contact with the wall of the hole E' and the tool is further advanced on the operator continuing the turning of the hand wheel $O^3$ then the tool F is caused to rotate with the revolving work E and as the tool F is secured in the tool holder H it is evident that the latter rotates within the retainer I. From the foregoing it will be seen that as the tool F is advanced in the hole or recess E' it is caused to turn by and in unison with the work E, and the wall of the hole E' is shaped according to the shape of the advancing tool F, that is, in the case mentioned the cylindrical hole E' is made hexagonal. After the tool has been advanced to the full depth of the hole or recess E' the operator turns the hand wheel O³ in the inverse direction of the arrow a' to withdraw the tool F from the hole E'.

From the foregoing it will be seen that by the arrangement described a screw machine, turret lathe or similar machine may be used for shaping bodies in the manner described and without requiring automatic brakes or stops on the machine.

It is expressly understood that although I have shown my improvements applied to a turret lathe I do not limit myself to this particular arrangement as the improvements may be applied to other similar machines.

Having thus described my invention, I claim as new and desire to secure by Letters Patent:

1. A shaping machine, comprising a revoluble work holder adapted to carry the work, a tool holder adapted to carry a tool for engagement with the said work, a retainer in which the said tool holder is mounted to rotate, and means for advancing the said retainer to force the tool into engagement with the revolving work, the latter imparting its rotary motion to the tool and its tool holder.

2. A shaping machine, comprising a revoluble work holder adapted to carry the work, a tool holder adapted to carry a tool for engagement with the said work, a retainer in which the said tool holder is mounted to rotate, a ball bearing in the said retainer, and thrust plates on opposite sides of the said ball bearing, one of the thrust plates bearing on the said tool holder and the other being seated in the retainer, and means for advancing the said retainer to force the tool into engagement with the revolving work, the latter imparting its rotary motion to the tool and its tool holder.

3. A shaping machine, comprising a revoluble holder adapted to carry the work, a sliding support, a retainer carried by the support, a tool holder mounted to rotate in the retainer and adapted to carry a tool for engaging the work, and means for advancing the support to force the tool into engagement with the work and thereby cause the tool and its holder to be revolved with the work.

In testimony whereof I have signed my name to this specification in the presence of two subscribing witnesses.

ROBERT F. SMITH.

Witnesses:
 Roy Smith,
 Ernest W. Hadydon.